US007384999B2

(12) United States Patent
Balent et al.

(10) Patent No.: US 7,384,999 B2
(45) Date of Patent: Jun. 10, 2008

(54) POWDERY PIGMENT PREPARATIONS FOR DYEING FILMS

(75) Inventors: Robert Balent, Frankfurt am Main (DE); Dietmar Beck, Bad Soden (DE); Heinfred Ohleier, Kelsterbach (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 11/475,502

(22) Filed: Jun. 27, 2006

(65) Prior Publication Data
US 2006/0241231 A1 Oct. 26, 2006

Related U.S. Application Data

(62) Division of application No. 10/466,142, filed as application No. PCT/EP02/00310 on Jan. 15, 2002, now abandoned.

(30) Foreign Application Priority Data
Jan. 18, 2001 (DE) ................................ 101 02 019

(51) Int. Cl.
C08K 3/18 (2006.01)
(52) U.S. Cl. ........................ 524/431; 428/412; 524/81; 524/86; 524/87; 524/89; 524/90; 524/107; 524/432; 525/176; 525/193; 526/318.2
(58) Field of Classification Search ................ 428/412; 524/81, 86, 87, 89, 90, 107, 431, 432; 525/176, 525/193; 526/318.2
See application file for complete search history.

(56) References Cited

U.S. PATENT DOCUMENTS

| 3,764,587 | A | * | 10/1973 | Zunker ..................... 526/318.2 |
| 3,806,464 | A | | 4/1974 | Matrick et al. |
| 4,417,013 | A | | 11/1983 | Schuster |
| 4,686,260 | A | * | 8/1987 | Lindemann et al. ........ 524/458 |
| 4,948,546 | A | * | 8/1990 | Delphin et al. ............. 264/216 |
| 5,200,484 | A | | 4/1993 | Reimann |
| 5,202,382 | A | | 4/1993 | Pettit, Jr. |
| 5,240,465 | A | | 8/1993 | Palacin |
| 5,298,129 | A | | 3/1994 | Eliash |
| 5,300,148 | A | | 4/1994 | Domingo et al. |
| 5,484,456 | A | | 1/1996 | Hiuke et al. |
| 5,554,199 | A | | 9/1996 | Baumann |
| 5,626,662 | A | | 5/1997 | Urban |
| 5,652,316 | A | | 7/1997 | May et al. |
| 5,681,876 | A | | 10/1997 | Schneider et al. |
| 5,800,607 | A | | 9/1998 | Schnaitmann et al. |
| 5,942,010 | A | | 8/1999 | Baumann |
| 6,432,185 | B1 | | 8/2002 | Bauer et al. |
| 6,479,569 | B2 | | 11/2002 | Jung et al. |
| 6,482,558 | B1 | | 11/2002 | Singh et al. |
| 6,512,115 | B2 | | 1/2003 | Kaul et al. |
| 6,521,756 | B2 | | 2/2003 | Weber et al. |
| 6,562,121 | B2 | | 5/2003 | Nickel et al. |
| 6,582,508 | B2 | | 6/2003 | Dietz et al. |
| 6,812,278 | B2 | | 11/2004 | Harris et al. |
| 6,718,958 | B2 | | 7/2005 | Weber et al. |
| 6,953,818 | B2 | | 10/2005 | Schmalzl |
| 7,087,677 | B2 | | 8/2006 | Kaul et al. |

FOREIGN PATENT DOCUMENTS

DE 44 27 931 11/1995
EP 0 718 327 6/1996

OTHER PUBLICATIONS

English Translation of PCT International Search Report for PCT/EP02/00310 mailed Nov. 5, 2002.

* cited by examiner

*Primary Examiner*—Terressa Boykin
(74) *Attorney, Agent, or Firm*—Anthony A. Bisulca

(57) ABSTRACT

The invention relates to a powdery pigment preparation containing a pigment which is dispersed in an acrylate resin and which is characterized in that the acrylate resin has an average molecular mass Mw ranging from 40000 to 80000 g/mol and is a copolymer comprised of 50 to 65 mol % ethyl methacrylate, of 30 to 45 mol % butyl methacrylate, and of 0.5 to 5 mol % methacrylic acid. The powdery pigment preparation can be used for dyeing films, particularly those made of polymethyl methacrylate. The films do not have any specks nor holes.

10 Claims, No Drawings

POWDERY PIGMENT PREPARATIONS FOR DYEING FILMS

CROSS REFERENCE TO RELATED APPLICATION

This Application is a divisional application of U.S. Ser. No. 10/466,142 filed Jul. 11, 2003 by Balent et al. now abandoned which is a 371 of PCT/EP02/00310 filed Jan. 15, 2002.

Powdery pigment preparations for dyeing films

The invention relates to powderous pigment preparations particularly suitable for coloring films of polymethyl methacrylate (PMMA).

EP-A-0 718 327 describes poly(meth)acrylate copolymers used as pigment dispersants in polymeric compounds for producing extruded moldings.

U.S. Pat. No. 4,948,546 describes a method of producing flexible sheets of PMMA colored with inorganic pigments. In that method the pigments are used in the form of liquid or syrupy dispersions in defined acrylic copolymers.

The coloring of thin films of PMMA confronts the skilled worker with particular problems, since standard pigment preparations have the effect of, or are unable to prevent, the embrittlement of the film or the appearance of specks in the colored film.

It was an object of the present invention to find powderous pigment preparations capable of coloring thin PMMA films without the resultant film exhibiting specks or holes.

It has been found that the pigment preparation below comprising an acrylic resin of defined composition surprisingly achieves the object proposed.

The present invention provides a powderous pigment preparation comprising an organic or inorganic pigment in dispersion in an acrylate resin, wherein the acrylate resin has an average molar mass Mw of between 40 000 and 80 000 g/mol, preferably 50 000 and 70 000 g/mol, in particular 55 000 to 65 000 g/mol, and is a copolymer of from 50 to 65 mol % ethyl methacrylate, from 30 to 45 mol % butyl methacrylate, and from 0.5 to 5 mol % methacrylic acid.

Preference in the context of the present invention is given to acrylate resins containing from 55 to 60 mol %, in particular from 57 to 59 mol %, ethyl methacrylate, from 35 to 40 mol %, in particular from 37 to 39 mol %, butyl methacrylate, and from 1 to 5 mol %, in particular from 2 to 4 mol %, methacrylic acid.

As butyl methacrylate it is preferred to use n- or iso-butyl methacrylate. Particular preference is given to n-butyl methacrylate.

Particularly suitable organic pigments include monoazo, disazo, and laked azo pigments, azo condensation pigments, benzimidazolone, naphthol, isoindolinone, isoindoline, phthalocyanine, quinacridone, anthanthrone, perylene, perinone, thioindigo, thiazineindigo, quinophthalone, dioxazine, and diketopyrrolopyrrole pigment, and carbon black.

Examples are C.I. Pigment Brown 25, 41, P. Violet 19, P.Y. 17, 110, P. R. 101, 185, 254, P. Blue 15:1, 15:3, P. Green 7.

Particularly suitable inorganic pigments include nickel titanates, chromium titanates, iron oxides, ultramarine, chromium oxide, and titanium dioxide.

The weight ratio between the pigment and the acrylate resin is preferably from 70:30 to 30:70, in particular from 55:45 to 45:55.

Preferred powderous pigment preparations are those consisting essentially of a) from 30 to 70% by weight, preferably from 45 to 55% by weight, of a pigment;
b) from 70 to 30% by weight, preferably from 55 to 45% by weight, of said acrylate resin;
c) from 0 to 8% by weight, preferably from 2 to 4% by weight, of a lubricant, and
d) from 0 to 10% by weight, preferably from 0 to 1% by weight, of further customary additives, the sum of all components being 100% by weight.

The acrylate resin used in accordance with the invention can be prepared by customary methods, e.g., by techniques of solution or emulsion polymerization that are known to the skilled worker.

Component c) suitably comprises lubricants, such as epoxidized soybean oils, fatty alcohol ethoxylates, and fatty acid esters, for example.

Examples of suitable components d) include wetting agents, dedusting agents, antifoams, and anticaking agents.

The pigment preparations of the invention can be produced by dispersing the pigment in the acrylate resin, plastifying the mixture at from 100 to 160° C., preferably from 100 to 150° C., in particular from 100 to 140° C., and comminuting the plastic mass.

The pigment, appropriately in powder form, is preferably incorporated by dispersion into the acrylate resin or into a mixture of components b), c) and/or d), and the mixture is plastified by introduction of steam with a temperature of from 100 to 160° C., preferably from 100 to 150° C. This incorporation takes place normally using a dispersion compounder. During and after the introduction of steam the mixture is appropriately kneaded. Subsequently, preferably with the addition of a little water, the plastified mass is cooled to a temperature of 60 to 80° C. for its comminution. The brittle mass is then fractionated in the compounder and ground in a mechanical mill. It is also possible to adopt a procedure in which components b), c) and/or d) are mixed first of all, then plastified as described by the introduction of steam, and the pigment is incorporated into the plastic mass by kneading.

The kneading time is appropriately from 10 to 60 minutes. The particle size after grinding is generally from 100 to 200 μm. The pigment preparation of the invention is free-flowing, nondusting, and easy to meter.

The pigment preparations of the invention are suitable for use as colorants for coloring high molecular mass materials, such as plastics, paints, and printing inks, for example. With particular advantage they are used for coloring PMMA, especially for coloring PMMA films. This can be done by incorporating the pigment preparation into thermoplastic PMMA to give a compounded formulation with a pigment concentration of, for example, between 0.5 and 8% by weight, based on the overall weight of the formulation. The incorporation can be carried out using conventional kneading apparatus or extruders and preferably at temperatures between 180 and 220° C.

The compounded formulation produced in this way can be used for further processing steps, an example being film production. Films can be produced, for example, by melting the pigment preparation of the invention together with PMMA carrier material, or in the form of said compounded formulation, on one or more plastifying units, and from 190 to 220° C. for example, and bringing the composition into film form by means of a downstream tool. Suitable plastifying units include preferably extruders or compounders.

As extrusion installations it is possible to use mono-or coextrusion installations and also calenders. Depending on the individual thicknesses, e.g., from 5 to 1000 μm, preferably from 80 to 120 μm, different dies/calender nips are used. Preferred areas for use of the films of the invention are as laminating foils.

A particular advantage of the pigment preparations of the invention is that compounded PMMA formulations with a high pigment concentration can be provided which can be processed directly to thin films which are free from specks and holes.

The pigment preparations produced in accordance with the invention are also suitable for use as colorants in electrophotographic toners and developers, such as one-or two-component powder toners (also called one-or two-component developers), magnetic toners, liquid toners, polymerization toners, and specialty toners, for example.

Suitable toner binders are addition polymerization resins, polyaddition resins, and polycondensation resins, such as styrene, styreneacrylic, styrenebutadiene, acrylic, polyester, and phenolic epoxy resins, polysultones, polyurethanes, individually or in combination, and also polyethylene and polypropylene, which may contain further ingredients, such as charge control agents, waxes or flow assistants, or may be modified subsequently with such additions.

The pigment preparations produced in accordance with the invention are also suitable for use as colorants in powders and powder coating materials, particularly in triboelectrically or electrokinetically sprayable powder coating materials that are employed for the surface coating of articles made for example of metal, wood, plastic, glass, ceramic, concrete, textile material, paper or rubber.

The resins used as powder coating resins are typically epoxy resins, carboxyl-and hydroxyl-containing polyester resins, polyurethane resins and acrylic resins, together with customary curing agents. Combinations of resins also find application. For example, epoxy resins are frequently used in combination with carboxyl-and hydroxyl-containing polyester resins. Typical curing components (depending on the resin system) are, for example, acid anhydrides, imidazoles, and dicyandiamide and its derivatives, capped isocyanates, bisacylurethanes, phenolic and melamine resins, triglycidyl isocyanurates, oxazolines, and dicarboxylic acids.

The pigment preparations produced according to the invention are additionally suitable for use as colorants in ink-jet inks, both aqueous and nonaqueous, and in those inks which operate in accordance with the hot-melt process, and also for "electronic inks".

Furthermore, the pigment preparations produced in accordance with the invention are also suitable for use as colorants for color filters, for both subtractive and additive color generation.

The invention is illustrated by examples below. Parts denote parts by weight.

EXAMPLE 1

In a dispersion compounder, 225 parts of acrylate resin (consisting of 58 mol % ethyl methacrylate, 39 mol % n-butyl methacrylate and 3 mol % methacrylic acid; molar mass 59 000 g/mol) and 9 parts of epoxidized soybean oil are mixed at room temperature. Then steam (130° C.) is introduced and the mass is plastified. 225 parts of C.I. Pigment Blue 15:1 are incorporated in portions into the plastic mass over the course of 15 minutes, followed by kneading at 110° C. for 30 minutes more. Thereafter the mass, with the addition of a little water, is comminuted, the compounder is switched off, and the brittle mass, after it has cooled, is fractionated in the compounder. It is subsequently ground in a mechanical mill. This produces a powderous pigment preparation.

EXAMPLE 2

In a dispersion compounder, 225 parts of acrylate resin (consisting of 60 mol % ethyl methacrylate, 38 mol % n-butyl methacrylate and 2 mol % methacrylic acid; molar mass 60 000 g/mol) and 9 parts of epoxidized soybean oil are mixed at room temperature. Then steam (130° C.) is introduced and the mass is plastified. 225 parts of C.I. Pigment Violet 19 are incorporated in portions into the plastic mass over the course of 15 minutes, followed by kneading at 110° C. for 30 minutes more. Thereafter the mass, with the addition of a little water, is comminuted, the compounder is switched off, and the brittle mass, after it has cooled, is fractionated in the compounder. It is subsequently ground in a mechanical mill. This produces a powderous pigment preparation.

EXAMPLE 3

In a dispersion compounder, 225 parts of acrylate resin (consisting of 56 mol % ethyl methacrylate, 40 mol % n-butyl methacrylate and 4 mol % methacrylic acid; molar mass 60 000 g/mol) and 9 parts of fatty alcohol ethoxylate are mixed at room temperature. Then steam (130° C.) is introduced and the mass is plastified. 225 parts of C.I. Pigment Red 254 are incorporated in portions into the plastic mass over the course of 20 minutes, followed by kneading at 110° C. for 30 minutes more. Thereafter the mass, with the addition of a little water, is comminuted, the compounder is switched off, and the brittle mass, after it has cooled, is fractionated in the compounder. It is subsequently ground in a mechanical mill. This produces a powderous pigment preparation.

EXAMPLE 4

In a dispersion compounder, 225 parts of acrylate resin (consisting of 58 mol % ethyl methacrylate, 39 mol % n-butyl methacrylate and 3 mol % methacrylic acid; molar mass 59 000 g/mol) and 18 parts of epoxidized soybean oil are mixed at room temperature. Then steam (130° C.) is introduced and the mass is plastified. 225 parts of C.I. Pigment Yellow 17 are incorporated in portions into the plastic mass over the course of 20 minutes, followed by kneading at 110° C. for 30 minutes more. Thereafter the mass, with the addition of a little water, is comminuted, the compounder is switched off, and the brittle mass, after it has cooled, is fractionated in the compounder. It is subsequently ground in a mechanical mill. This produces a powderous pigment preparation.

EXAMPLE 5

In a dispersion compounder, 225 parts of acrylate resin (consisting of 57 mol % ethyl methacrylate, 40 mol % n-butyl methacrylate and 3 mol % methacrylic acid; molar mass 59 000 g/mol) and 18 parts of fatty alcohol ethoxylate are mixed at room temperature. Then steam (130° C.) is introduced and the mass is plastified. 225 parts of C.I. Pigment Red 185 are incorporated in portions into the plastic mass over the course of 22 minutes, followed by kneading at 110° C. for 30 minutes more. Thereafter the mass, with the addition of a little water, is comminuted, the compounder is switched off, and the brittle mass, after it has cooled, is fractionated in the compounder. It is subsequently ground in a mechanical mill. This produces a powderous pigment preparation.

EXAMPLE 6

In a dispersion compounder, 225 parts of acrylate resin (consisting of 58 mol % ethyl methacrylate, 39 mol % n-butyl methacrylate and 3 mol % methacrylic acid; molar mass 59 000 g/mol) and 18 parts of epoxidized soybean oil are mixed at room temperature. Then steam (130° C.) is introduced and the mass is plastified. 225 parts of C.I. Pigment Red 101 are incorporated in portions into the plastic mass over the course of 20 minutes, followed by kneading at 110° C. for 30 minutes more. Thereafter the mass, with the addition of a little water, is comminuted, the compounder is switched off, and the brittle mass, after it has cooled, is fractionated in the compounder. It is subsequently ground in a mechanical mill. This produces a powderous pigment preparation.

USE EXAMPLE

In a batchwise mixing operation polymethyl methacrylate (PMMA), additives, such as lubricants, adhesion preventatives, heat stabilizers and plasticizers, for example, and a powderous pigment preparation from Examples 1 to 6 are mixed until the mixture is homogeneous. The resultant compounded formulation is passed to a planetary roll extruder under pressure and temperature and is melted.

In the course of this operation the pigment preparations of the invention are likewise melted and distributed to optimum effect in the plastified material, so that coloring is homogeneous.

By the tool of the planetary roll extruder the plastified and colored material is extruded onto a conveyor belt and so passes to the calender rolls, where it is first of all melted further in the nip between two corotating, heated metal rolls.

Further rolls downstream provide for additional homogenization and corresponding adjustment to the thickness of the sheetlike end product.

In this way colored PMMA films which are free from specks and holes are obtained.

The invention claimed is:

1. A colored polymethyl methacrylate film comprising polymethyl methacrylate film colored by a pigment composition, wherein the pigment composition comprises a pigment in dispersion in an acrylate resin, wherein the acrylate resin has an average molar mass Mw of between 40 000 and 80 000 g/mol and is a copolymer of from 50 to 65 mol % ethyl methacrylate, from 30 to 45 mol % butyl methacrylate, and from 0.5 to 5 mol % methacrylic acid, wherein colored polymethyl methacrylate film has a thickness of between 5 to 1000 μm.

2. A colored polymethyl methacrylate film as claimed in claim 1, wherein the acrylate resin has an average molar mass Mw between 50 000 and 70 000 g/mol.

3. A colored polymethyl methacrylate film as claimed in claim 1, wherein the acrylate resin is composed of from 55 to 60 mol % ethyl methacrylate, from 35 to 40 mol % butyl methacrylate, and from 1 to 4 mol % methacrylic acid.

4. A colored polymethyl methacrylate film as claimed in claim 1, wherein the butyl methacrylate is n-butyl methacrylate.

5. A colored polymethyl methacrylate film as claimed in claim 1, wherein the weight ratio between the pigment and the acrylate resin is from 70:30 to 30:70.

6. A colored polymethyl methacrylate film as claimed in claim 1, wherein the pigment is selected from the group consisting of a monoazo, disazo, laked azo pigment, azo condensation pigment, benzimidazolone, naphthol, isoindolinone, isoindoline, phthalocyanine, quinacridone, anthanthrone, perylene, perinone, thioindigo, thiazineindigo quinophthalone, dioxazine, diketopyrrolopyrrole pigment and carbon black.

7. A colored polymethyl methacrylate film as claimed in claim 1, wherein the pigment is a nickel titanate, chromium titanate, iron oxide, ultramarine, chromium oxide or titanium dioxide.

8. A colored polymethyl methacrylate film as claimed in claim 1, wherein the pigment composition further comprises
   a) from 30 to 70% by weight of the pigment;
   b) from 70 to 30% by weight of the acrylate resin,
   c) from 0 to 8% by weight of a lubricant, and
   d) from 0 to 10% by weight of additives, the sum of all components being 100% by weight.

9. A colored polymethyl methacrylate film as claimed in claim 1, wherein the pigment composition further comprises:
   a) from 45 to 55% by weight of the pigment;
   b) from 55 to 45% by weight of the acrylate resin,
   c) from 2 to 4% by weight of a lubricant, and
   d) from 0 to 1% by weight, of at least one additive, the sum of all components being 100% by weight.

10. A method for coloring the colored polymethyl methacrylate film as claimed in claim 1, comprising the step of adding the pigment composition to the polymethyl methacrylate during the production of the polymethyl methacrylate film.

* * * * *